United States Patent

Leverenz

[11] 4,116,640
[45] Sep. 26, 1978

[54] SALT DISSOLVER

[75] Inventor: Melvin E. Leverenz, St. Clair, Mich.

[73] Assignee: Diamond Crystal Salt Company, St. Clair, Mich.

[21] Appl. No.: 771,460

[22] Filed: Feb. 24, 1977

[51] Int. Cl.² .................. B01D 11/02; C01D 3/04
[52] U.S. Cl. .................. 422/264; 210/323 T; 422/278
[58] Field of Search .......... 23/272 AH, 271 R, 267 E; 210/323 T, 281, 345

[56] References Cited

U.S. PATENT DOCUMENTS

| 2,122,119 | 6/1938 | Thibert | 210/323 T |
| 2,956,682 | 10/1960 | Stephan | 210/281 |
| 3,123,445 | 3/1964 | Heath | 23/272 AH |
| 3,307,914 | 3/1967 | Heiss | 23/272 AH |
| 3,365,280 | 1/1968 | Heiss | 23/272 AH |
| 3,647,083 | 3/1972 | Niccum | 210/345 |
| 3,684,457 | 8/1972 | Pinto | 23/272 AH |
| 3,984,327 | 10/1976 | May | 210/345 |

FOREIGN PATENT DOCUMENTS

| 637,912 | 3/1962 | Canada | 23/272 AH |
| 588,115 | 10/1924 | France | 210/345 |

Primary Examiner—Stephen J. Emery
Attorney, Agent, or Firm—Harness, Dickey & Pierce

[57] ABSTRACT

An improved salt dissolver for producing a uniform supply of a concentrated salt solution incorporating a novel filter and collector manifold assembly adjacent to the base of a tank adapted to be filled with bulk quantities of a soluble salt compound. The filter and collector manifold arrangement provides for high solution flow rate and facilitates replacement of the tubular filter element as may be required or desired from time to time.

9 Claims, 7 Drawing Figures

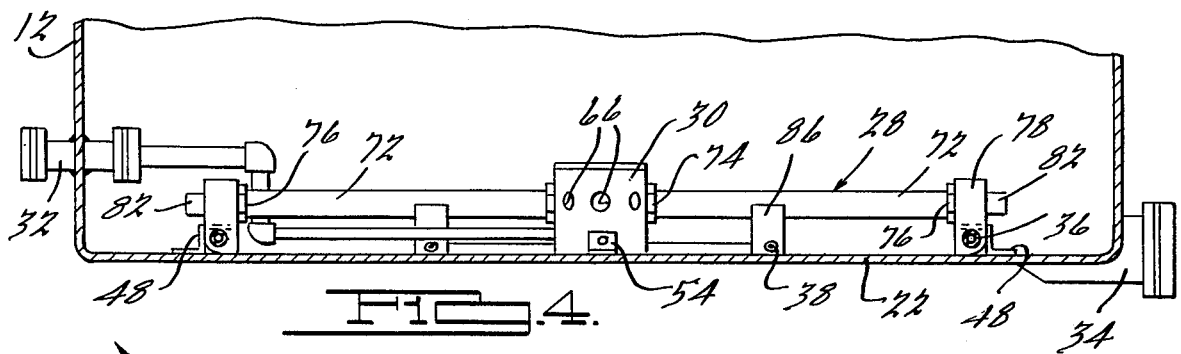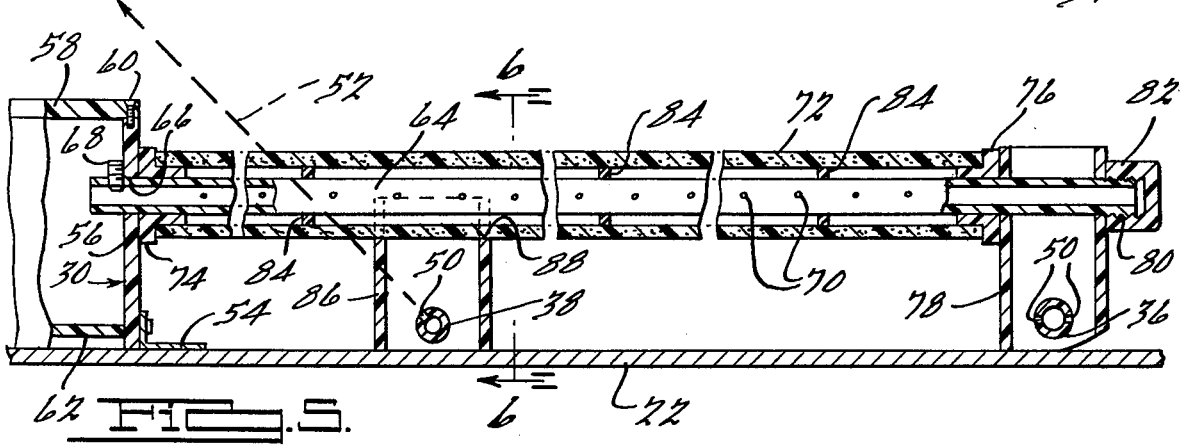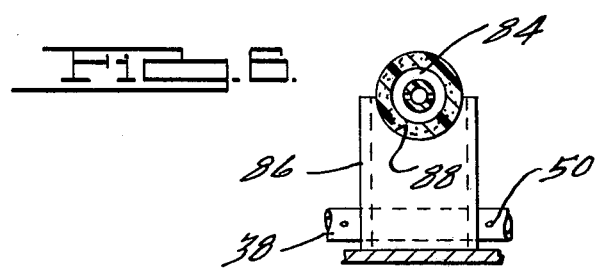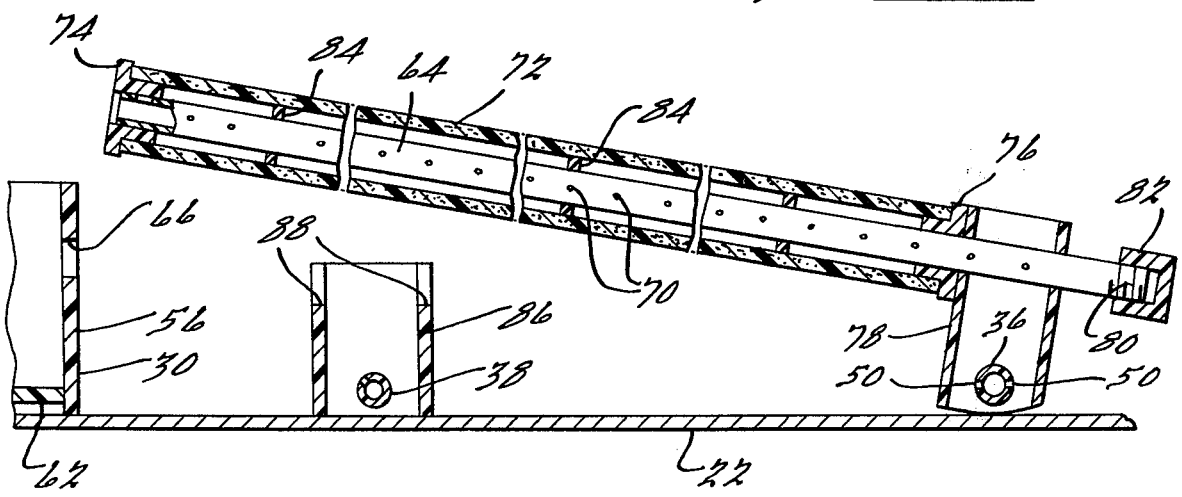

SALT DISSOLVER

BACKGROUND OF THE INVENTION

The salt dissolver unit of the present invention is broadly applicable for producing concentrated solutions of various liquid soluble compounds such as aqueous solutions of water soluble salt compounds including sodium chloride, potassium chloride, potassium nitrate, sodium nitrate, calcium chloride, ammonium nitrate, ammonium sulfate and the like. The dissolver unit is particularly applicable for the generation and supply of saturated brine solutions utilizing purified granulated salt crystals which can be used in the food and meat packing industries, for example.

Prior art bulk salt dissolver units of the type capable of handling a charge of a granular salt compound of ten tons up to about 60 tons or more have conventionally employed collector manifolds positioned adjacent to the base of the dissolver tank and buried beneath a plurality of layers of gravel, each of a controlled different size to effect a controlled filtration of the salt solution before entry into the collector manifold. In order to provide effective filtration, a considerable volume of gravel must be employed which correspondingly reduces the storage capacity of the tank. The fact that the gravel bed ordinarily must be discarded each time the tank is cleaned also constitutes a costly and time consuming operation, and for these and other reasons, alternative filter and collector systems have been proposed for use in lieu of conventional gravel bed type systems.

Alternative filter and collector systems heretofore proposed have not been entirely satisfactory in that they have failed to provide the desired high-capacity flow of concentrated salt solutions, have required the use of relatively complex and cumbersome structural arrangements in an attempt to counteract the tremendous weight of the bulk salt charge in the dissolver unit and have presented problems in connection with the inspection and replacement of the filter media as may be required from time to time.

The improved salt dissolver of the present invention overcomes many of the problems and disadvantages associated with prior art constructions in providing a dissolver unit which is of simple design and construction, which provides for a constant high-capacity supply of a clear concentrated salt solution, and which provides a filtration and collector manifold assembly by which the filter elements can readily be inspected and replaced, if necessary, requiring minimal time and effort.

SUMMARY OF THE INVENTION

The benefits and advantages of the present invention are achieved by a salt dissolver unit comprising a tank or vessel formed with a base and which is adapted to be filled with a bulk quantity of a particulated salt compound such as, for example, evaporated salt crystals of sodium chloride for producing a saturated brine solution. A sparger assembly is disposed adjacent to the base of the tank for introducing a liquid such as water into the tank to effect a progressive dissolution of the granulated salt charge therein. A collector manifold is disposed adjacent to the sparger assembly for withdrawing the filtered salt solution from the chamber as required and includes a collector chamber which is supported from the base and a plurality of elongated foraminous collector conduits mounted such that one end thereof is removably connected in communication with the interior of the collector chamber. A sleeve of a porous filter media is removably disposed in overlying relationship around each of the collector conduits and is retained in appropriate position thereon by suitable retaining means. Each of the collector conduits and the encompassing filter media is supported in appropriate disposition relative to the base and in a manner such that the conduits upon uncoupling from the collector manifold can be angularly tilted with respect to the base, enabling removal and replacement of the filter elements thereon. A suitable outlet conduit is connected to the collector chamber for withdrawing the salt solution from the collector manifold assemblies to a location exteriorly of the tank.

In accordance with a preferred embodiment of the present invention, the tank is of a circular cross sectional configuration and the collector manifold is comprised of an upright cylindrical collector chamber disposed centrally of the base of the tank, wherein the collector conduits incorporating a tubular filter sleeve thereover are arranged in substantially equal circumferentially spaced horizontal radially extending relationship with their inner ends connected in communication to the collector chamber. The sparger assembly comprises a plurality of conduits positioned below the collector manifold and is formed with a plurality of nozzles for directing the liquid into the tank adjacent to the base in a substantially horizontal direction.

Additional benefits and advantages of the present invention will become apparent upon a reading of the description of the preferred embodiments taken in conjunction with the accompanying drawings.

BRIEF DESCRIPTION OF THE DRAWINGS

FIG. 4 is a transverse vertical sectional view of the lower portion of the salt dissolver unit illustrating the collector manifold assembly in elevation;

FIG. 5 is a longitudinal vertical sectional view partly in elevation of a foraminous collector conduit and tubular filter element connected to the collector chamber and supported by support columns;

FIG. 6 is a transverse vertical sectional view through the collector conduit and filter element shown in FIG. 5 as viewed along the line 6—6 thereof; and FIG. 7 is a longitudinal vertical sectional view similar to FIG. 5 illustrating the collector conduit uncoupled from the collector chamber and tilted so as to enable replacement of the tubular filter element therearound.

DESCRIPTION OF THE PREFERRED EMBODIMENTS

Figure 1:
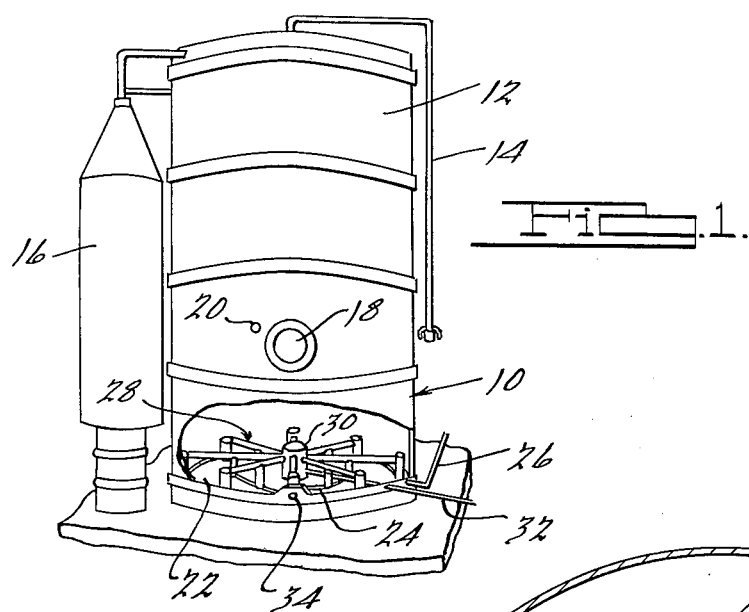
FIG. 1 is a perspective side elevational view with portions thereof broken away of a salt dissolver filter unit constructed in accordance with the preferred embodiments of the present invention.

Referring now in detail to the drawings, and as may be best seen in FIG. 1 thereof, a bulk salt dissolver unit 10 is illustrated comprising an upright tank or vessel 12 which may be provided with a suitable layer of insulation and heating elements therearound to permit outside storage in cold weather areas. The dissolver 10 is provided with a fill pipe 14 disposed in communication with the upper central portion of the tank 12, enabling a pneumatic charging of a granular salt compound, such as sodium chloride, for example, directly from a supply truck. A suitable cyclonic-type dust collector 16 is provided and is connected to the upper portion of the tank 12 to reduce dusting during the pneumatic charging of the salt compound into the tank. The side wall of the tank 12 is provided with a suitable removable manhole cover 18 for gaining access to the interior thereof and a coupling 20 is provided for receiving a suitable device for sensing the level of liquid in the tank.

In the specific embodiment shown, the tank is of a substantially circular upright cross sectional configuration including a substantially flat circular base 22 on which a sparger assembly 24 is mounted for introducing liquid, such as water, into the tank to effect a dissolution of the granulated salt compound therein. The sparger assembly 24 is connected to a water supply pipe 26, which in turn is connected to a pressurized supply, such as the domestic water supply system. A collector manifold system 28 is supported on the base 22 above the sparger assembly 24 and includes a centrally positioned manifold chamber 30 which is connected by means of a discharge conduit 32 to a suitable pump (not shown) for withdrawing the concentrated salt solution from the tank. The withdrawal of concentrated salt solution can also be performed by means of gravity flow, as may be desired. The liquid in the tank can be drained through a drain port 34 disposed adjacent to the base of the tank.

In its structural aspects, the various components are comprised of a material resistant to the salt compound, as well as the resultant concentrated solution formed. In the case of the formation of saturated brine solutions from evaporated granulated sodium chloride crystals, particularly satisfactory results have been obtained employing a tank comprised of fiberglass-reinforced polyester resin with the various conduits comprised of plastic tubing, such as polyvinyl chloride tubing, and with specific fastening devices, such as screws, bolts, etc., being comprised of a corrosion resistant stainless steel. The unique structural arrangement of the sparger and manifold collector system enables the use of such synthetic resin despite the high loading to which the assemblies are subjected by the overlying bed of granulated salt compound within the tank itself.

Figure 2:
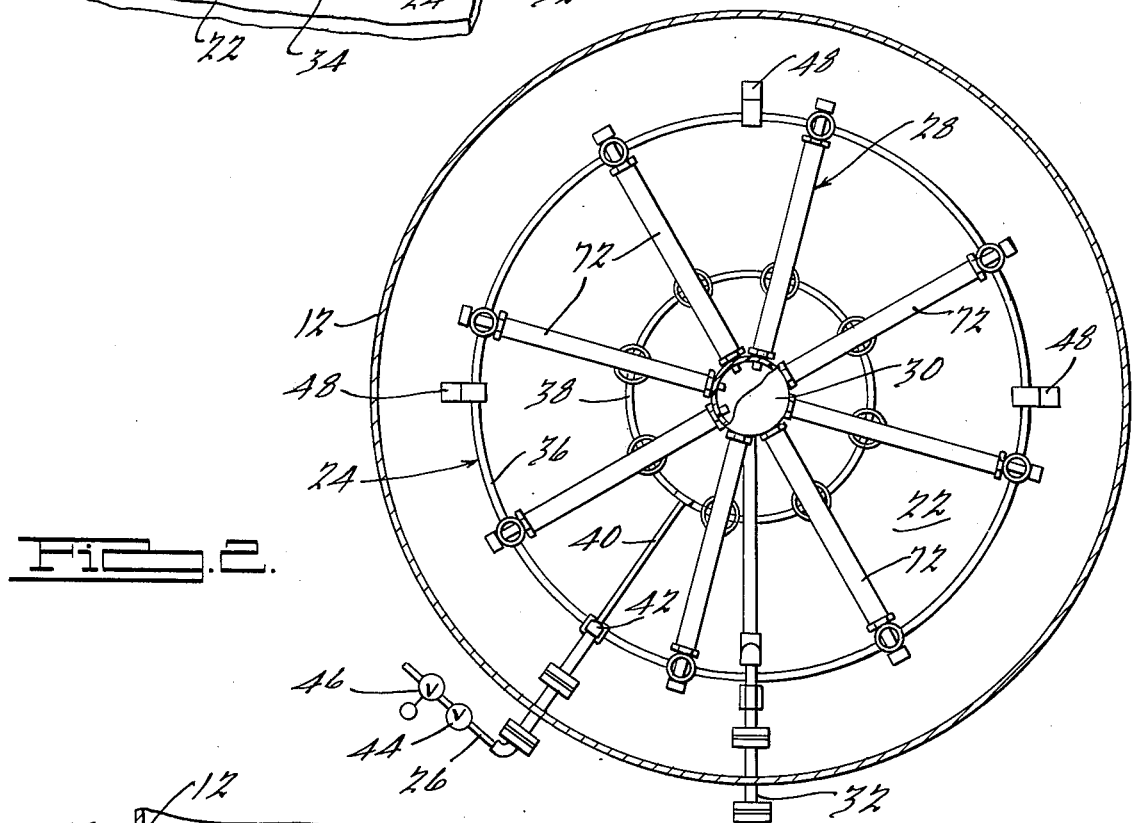
FIG. 2 is a transverse magnified sectional view illustrating the sparger assembly and collector manifold assembly adjacent to the base of the tank in plan.
Figure 3:
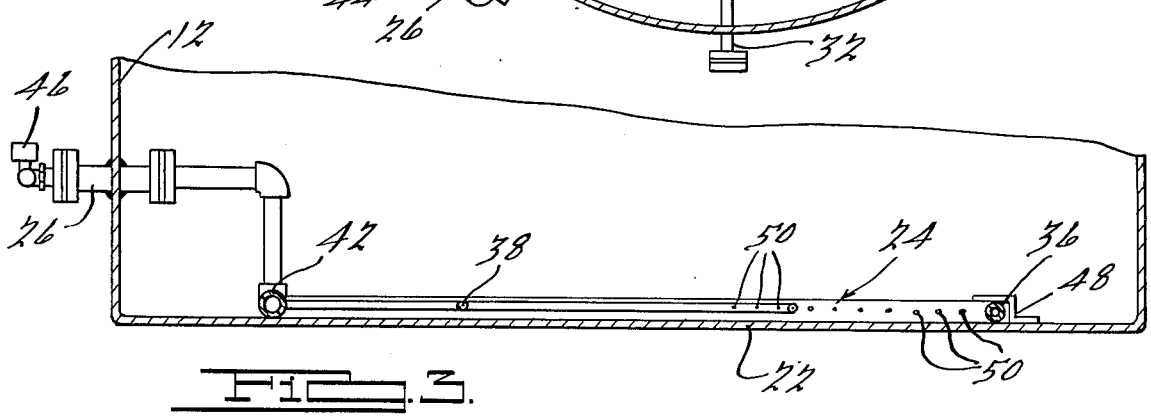
FIG. 3 is a transverse vertical sectional view of the lower portion of the salt dissolver unit illustrating the disposition of the sparger assembly.

The sparger assembly 24, as best seen in FIGS. 2 and 3, is comprised of an outer circular conduit 36 and an inner circular conduit 38 disposed concentric to each other and to the periphery of the outer wall of the tank 12 and are interconnected by means of a radial supply conduit 40. The outer circular conduit 36 is formed with a T-connector 42, to which the supply conduit 26 is connected through a suitable flange connector extending through the side wall of the tank. As best seen in FIGS. 2 and 3, the liquid supply conduit 26 is provided with a manual shut-off valve 44 and a motorized flow control valve 46, the latter being operatable in response to a liquid level control system (not shown) of any of the types well known in the art to maintain the liquid level within the interior of the tank at the desired level. As previously indicated, the coupling 20 (FIG. 1) is adapted to receive a suitable liquid level sensing unit, such as a sonic sensor, for example, which through conventional circuitry, is connected to the motorized flow control valve 46, regulating the flow of liquid such as water into the tank to maintain the level of liquid substantially constant in spite of variations in the rate of withdrawal of saturated brine from the tank.

The outer circular conduit 36 and inner circular conduit 38 are positioned adjacent to the base 22 of the tank and the outer conduit is retained in appropriate position by means of a plurality of overlying Z-shaped clamp members 48. Each of the circular conduits is provided with a plurality of apertures or nozzles 50, such as indicated in FIG. 3, along the length thereof for discharging the liquid, such as water, preferably in a direction substantially horizontal with respect to the base of the tank. The nozzles 50 are preferably disposed at opposite sides of the conduit so as to direct radially inwardly and radially outwardly jets of liquid into the granulated mass of salt compound. Certain of the nozzles along the inner surface of the inner circular conduit 38 are oriented at an angular inclination, as best seen in FIG. 5, so as to direct a portion of the liquid upwardly in the direction of the arrow indicated at 52 toward a stratum immediately above the upper surface of the manifold chamber 30, promoting the dissolution of salt compound thereabove and preventing the formation of a solidified salt strata or cap over the manifold chamber. The velocity of the liquid discharged from the nozzles 50 also effects a partial fluidization of the salt particles in the vicinity adjacent to the sparger assembly and the manifold collector assembly, tending to counteract any tendency of the granular salt bed to become compacted as a result of the pressure drop thereacross in response to a withdrawal of concentrated brine solution through the manifold assembly.

The collector manifold system 28 as best seen in FIGS. 2 and 4-7, comprises the manifold chamber 30, which is adapted to be removably secured to the central portion of the base 22 by means of a pair of L-shaped pads 54 having their base legs affixed to the base of the tank. The manifold chamber 30 comprises a circular cylindrical shell 56 formed with a removable top closure 58 secured by a plurality of screws 60, as best seen in FIG. 5. A circular bottom panel 62 is secured in the lower portion of the shell 56, forming a substantially liquid-tight chamber for accumulating a saturated brine solution entering through the ends of a plurality of foraminous collector conduits 64.

In the specific embodiment as illustrated in the drawings, the shell 56 of the manifold chamber is provided with a plurality of circular openings or ports 66 disposed at substantially equal circumferentially spaced intervals therearound, which are of a size so as to slidably receive the inner end portions of the foraminous collector conduits 64, forming a slip fit, providing a substantial liquid-tight seal therebetween. The inner end portions of the foraminous collector conduits 64 are threaded to receive a stop screw 68, as shown in FIG. 5, which prevents inadvertent extraction of the conduits 64 from the manifold chamber. Access to the screws 68 is provided upon a removal of the screws 60, permitting removal of the top closure member 58.

Each of the foraminous collector conduits 64 extends in a substantially horizontal direction and in radial disposition with respect to the manifold chamber in accordance with the arrangement as illustrated in FIG. 2. Each of the foraminous collector conduits 64 is formed with a plurality of apertures 70 extending through the side walls thereof over substantially the entire peripheral length thereof for permitting ingress of filtered brine which in turn is discharged from the inner end thereof into the interior of the manifold chamber. A tubular filter element 72 overlies the major portion of the length of each of the collector conduits and is positioned with the inner surface thereof in spaced concentric relationship with respect to the periphery of the collector conduit.

As best seen in FIGS. 5 and 6, the inner end of the tubular filter element 72 is supported by a flanged annular collar 74 having an axial bore of a diameter to slidably overlie the periphery of the collector conduit. The minor diameter of the flanged collar is adapted to slidably and telescopically engage the inner end portion of the filter element, while the major flange portion is adapted to overlie the end edge of the tubular filter element. A similar flanged annular collar 76 is provided for supporting the outer end of each of the filter elements. The face of the flanged annular collar 74 is adapted to be disposed in bearing abutment against the periphery of the shell 56 of the manifold chamber, while the face of the outer flanged annular collar 76 is adapted to be disposed in abutting engagement with the periphery of a tubular outer support column 78 as best seen in FIG. 5. The outer support column 78 is provided with a diametric bore for slidably receiving the end portion of the collector conduit 64, which is threaded at its outer end, as indicated at 80, for threadably receiving a threaded cap 82. The threaded cap 82 serves the dual function of sealing the outer end of the collector conduit, as well as applying a tensile force to the conduit between the stop screws 68 and the engaging face of the threaded cap so as to apply a small compressive force to the tubular filter element, assuring sealed engagement of the ends thereof in the annular collars.

The inner surface of the tubular filter element is maintained in appropriate spaced concentric relationship with respect to the periphery of the collector conduit by means of a series of longitudinally spaced annular spacer rings 84 secured at spaced intervals along the periphery of the collector conduit. The annular channels thus provided facilitate passage of filtered saturated brine solutions from the inner surface of the filter element through the apertures 70 into the interior of the collector conduit.

The collector conduit assemblies are also supported at a position intermediate of the manifold chamber and outer support column by means of inner support columns 86, as best seen in FIGS. 5 and 6, each of which is formed with diametrically disposed arcuate supporting surfaces 88 for cradling and supporting the periphery of the tubular filter element. The lower portion of the inner support column 86 is formed with a diametric bore through which the inner circular conduit 38 extends, which serves to locate the support as well as to anchor it to a position in supporting relationship with respect to the base 22 of the tank. The outer support column 78 similarly is provided with diametric bores for slidably receiving the outer circular conduit 36, effecting a radial anchoring of the support.

The structural configuration of the inner and outer support columns in further combination with the sliding interfitting relationship of the components of each collector conduit assembly provides for a simple replacement of the tubular filter elements as may be required from time to time. As best seen in FIGS. 5 and 7, a replacement of a tubular filter element 72 is effected after the granular salt charge has been consumed and the tank drained by first removing the retainer screws 60, enabling the top closure 58 of the manifold chamber to be removed. The stop screws 68 are thereafter removed, permitting the collector conduit to be slidably withdrawn from the port 66 to a retracted position and then angularly tilted such as shown in FIG. 7. In that position, the tubular filter elements and the inner flanged annular collar can readily be slidably withdrawn from the conduit and a new one replaced. After replacement of the tubular filter element and the stop screw 68, appropriate tensioning of the collector conduit by means of the threaded caps 82 can be effected to achieve the requisite compressive sealing of the filter element between the spaced annular collars.

The tubular filter element itself may be comprised of any foraminous material which is resistant to chemical attack or the solubilizing effect of the salt compound and salt solution and of sufficient strength to prevent collapse due to the application of a differential pressure thereacross. Preferably, the tubular filter element is comprised of a porous material, such as a porous synthetic plastic or ceramic material, providing a tortuous path therethrough so as to entrap any minute particles which may enter the interstices of the filter. The pore size is selected so as to prevent passage of any insoluble particles through the filter and also to prevent partially dissolved soluble particles from entering the interior of the collector conduit. A filter having an average pore size approximately equal to that of the smallest solid salt particles charged to the tank has been found effective in preventing the passage of any undissolved, or partially dissolved, salt crystals of even smaller sizes through the filter and will effectively retain such undissolved particles within the interstices of the filter until they become completely dissolved. For example, filter elements having an average pore size of 395, 412 and 720 microns, have been found to effectively retain particles of a size of 150, 172 and 300 microns, respectively.

Of the various substances that can be satisfactorily employed for forming the tubular filter elements, ceramic materials, such as fused Alundum, for example, provide satisfactory operation, while expanded synthetic plastic materials are usually preferred due to their lower cost and ease of fabrication. Synthetic plastics suitable for this purpose include a variety of olefinic polymers, such as linear polyethylene, for example, and copolymers, such as the copolymerization product of styrene and acrylonitrile.

While it will be apparent that the invention herein described is well calculated to achieve the benefits and advantages set forth above, it will be appreciated that the invention is susceptible to modification, variation and change without departing from the spirit thereof.

What is claimed is:

1. A bulk salt dissolver for producing saturated salt solutions comprising a tank having a base and defining an upright internal chamber adapted to be at least partly filled with a particulated salt charge, a sparger assembly comprising a conduit disposed adjacent to said base and provided with a plurality of nozzles disposed at spaced intervals therealong for introducing liquid into said chamber, a collector manifold disposed above and adjacent to said sparger assembly for withdrawing a filtered salt solution from said chamber, said collector manifold comprising a collector chamber supported by said base and positioned at substantially the center thereof, at least a portion of said nozzles in said conduit angularly oriented to discharge liquid toward a region spaced immediately above said collector manifold, a plurality of elongated foraminous collector conduits extending outwardly from said collector manifold in a substantially horizontal direction above said sparger assembly toward the periphery of said tank, each collector including coupling means on one end thereof for removably connecting each conduit in communication with the interior of said collector chamber, a tubular cylindrical sleeve of substantially circular cross section comprised of a porous filter medium disposed with the inner surface of said sleeve in overlying spaced relationship around each of said collector conduits, retaining means for applying an axial clamping force against opposite ends of each said sleeve for removably retaining said sleeve in appropriate sealed and spaced position around said collector conduit, support means for removably supporting each said collector conduit and tubular sleeve in spaced relationship from said base enabling replacement of said tubular sleeve in response to uncoupling of said coupling means, and an outlet conduit connected to said collector chamber for withdrawing a salt solution from said manifold assembly to a location exteriorly of said tank.

2. The salt dissolver as defined in claim 1, in which a portion of said nozzles are oriented with the axis of discharge in a substantially horizontal plane.

3. The salt dissolver as defined in claim 1, in which said sparger assembly comprises a plurality of conduits disposed in spaced apart concentric relationship and extending over the base of said tank beneath said collector manifold.

4. The salt dissolver as defined in claim 1, in which said collector manifold includes a generally upright wall formed with a plurality of ports therethrough for slidably receiving said one end of each of said collector conduits defining therebetween said coupling means, and coacting means on said one end and said upright wall for removably retaining said one end of said conduit in telescopic disposition in said port.

5. The salt dissolver as defined in claim 1, in which each collector conduit includes spacer means disposed at longitudinally spaced intervals along the periphery thereof for supporting said sleeve in spaced relationship from the periphery of said collector conduits.

6. The salt dissolver as defined in claim 1, in which said retaining means comprises an annular collar slidably disposed in each end of said sleeve, and means including a threaded cap threadably affixed to the end of said collector conduit for applying an axial compressive force to said sleeve for removably clamping said sleeve and the collars in the ends thereof between said support means and said collector manifold.

7. The salt dissolver as defined in claim 1, in which said support means comprise a plurality of support columns removably connected at the lower ends thereof to said sparger assembly for retaining said columns in appropriate position on said base.

8. The salt dissolver as defined in claim 1, in which said support means include a plurality of columns supported on said base and mounted for pivoting movement to permit angular pivoting movement of said collector conduits relative to said base in response to an uncoupling of said coupling means and disconnection of said one end of the collector conduit from said collector chamber.

9. The salt dissolver as defined in claim 1, further including supply means connected to said sparger assembly for supplying liquid thereto and control means for controlling the level of salt solution in said tank.

* * * * *

UNITED STATES PATENT AND TRADEMARK OFFICE
CERTIFICATE OF CORRECTION

PATENT NO. : 4,116,640
DATED : September 26, 1978
INVENTOR(S) : Melvin E. Leverenz It is certified that error appears in the above-identified patent and that said Letters Patent are hereby corrected as shown below:

Column 7, line 2, after "collector" insert --conduit--

Signed and Sealed this

Twelfth Day of December 1978

[SEAL]

Attest:

RUTH C. MASON
Attesting Officer

DONALD W. BANNER
Commissioner of Patents and Trademarks